United States Patent [19]

Chang

[11] Patent Number: 4,734,471

[45] Date of Patent: Mar. 29, 1988

[54] METHOD OF CURING POLYFLUOROALKOXYPHOSPHAZENE

[75] Inventor: Suae-Chen Chang, Baton Rouge, La.

[73] Assignee: Ethyl Corporation, Richmond, Va.

[21] Appl. No.: 881,610

[22] Filed: Jul. 3, 1986

[51] Int. Cl.⁴ ............................................. C08G 79/02
[52] U.S. Cl. .................................. 525/538; 525/326.4; 525/326.6; 525/328.2; 525/328.4; 528/167; 528/168; 528/399
[58] Field of Search ................. 525/538, 326.4, 326.6, 525/328.2, 328.4; 528/167, 168, 399

[56] References Cited

U.S. PATENT DOCUMENTS 3,814,073  6/1974  Karstedt .................. 260/46.5 UA
4,053,456 10/1977  Dieck et al. ..................... 525/538
4,145,479  3/1979  Adams et al. ....................... 525/538

OTHER PUBLICATIONS

Korshak, et al., "J. Poly. Sci.", USSR, vol. 23, No. 2, pp. 477–483 (1981).

Primary Examiner—Harold D. Anderson
Attorney, Agent, or Firm—Donald L. Johnson; John F. Sieberth; J. D. Odenweller

[57] ABSTRACT

High molecular weight non cross-linked polyfluoroalkoxyphosphazenes containing some unsaturated groups can be cured (i.e. cross-linked) by contact with a catalyst consisting essentially of platinum, a platinum halide or a haloplatinic acid or their hydrates (e.g. chloroplatinic acid hydrate).

15 Claims, No Drawings

METHOD OF CURING POLYFLUOROALKOXYPHOSPHAZENE

BACKGROUND OF THE INVENTION

Polyphosphonitrilic chloride has been known for a long time (H. N. Stokes, Am. Chem. J. 19, 782 (1897)). It can be made by heating cyclic phosphonitrilic chloride. The polymer so made has been referred to as "inorganic rubber" because of its rubber-like qualities and insolubility in solvents. More recently it has been discovered that polyphosphonitrilic chloride could be made in the form of a substantially linear non cross-linked polymer (Allcock et al., J. Am. Chem. Soc., 87, 4216 (1965)). The non cross-linked polymer can be dissolved in solvents such as toluene, cyclohexane and tetrahydrofuran and while in solution reacted with reagents that replace the chlorine bonded to phosphorus with a broad range of substituent groups such as alkoxy, aryloxy and the like. These groups control the properties of the final polymer.

Once the desired substituents were in place, it became desirable to cure the polymer to convert it to a non-soluble more durable form with improved physical properties. It was found that this could be accomplished by adding peroxides and heating the composition to generate free radicals which caused the substituent groups to cross-link. Alternatively, the substituted polyphosphazenes could be sulfur-vulcanized the same as in the rubber industry if at least a portion of the substituent groups on phosphorus contained olefinic unsaturation. This was accomplished by adding sulfur and an accelerator plus other compounding ingredients and heating the blend to vulcanization temperature. Sulfur and peroxide cure are described in Kyker et al., U.S. Pat. No. 3,970,533 and in Cheng, U.S. Pat. No. 4,116,785.

Curing using these known methods requires heating the composition to fairly high temperatures to activate the curing agents. A need exists for a method of curing the high molecular weight non cross-linked polyphosphazenes at moderate temperatures.

SUMMARY OF THE INVENTION

According to the present invention, a method is provided for curing high molecular weight substantially linear non cross-linked polyorganophosphazenes which contain some olefinic unsaturated groups bonded to phosphorus at moderate temperatures without the use of peroxides or sulfur. This is accomplished by adding a small catalytic amount of platinum or a platinum compound to the uncured polymer and heating the composition at temperatures of about 50°–150° C.

DESCRIPTION OF THE PREFERRED EMBODIMENTS

A preferred embodiment of the invention is a process for curing a high molecular weight substantially linear polyorganophosphazene having at least a portion of its substituents on phosphorus in the form of olefinically unsaturated groups, said process comprising contacting said polyorganophosphazene with a small effective amount of a platinum halide, haloplatinic acid or hydrates thereof or mixtures thereof.

Polyorganophosphazenes consist essentially of a long chain backbone of about 20 to 50,000 or more repeating (—P=N—) units. The phosphorus can be substituted with a wide variety of organo groups. The organo substituted polymers are readily made by first making a polychlorophosphazene ("chloropolymer") by the thermal polymerization of purified cyclic $PNCl_2$ trimer at approximately 200°–250° C. The resulting chloropolymer can be substituted by reaction with a reactive organo compound which contains a reactive hydrogen atom. This is generally conducted in the presence of a tert-amine to react with the HCl which is split off. Alternatively, the reactive organo compound can be reacted with an alkali metal (e.g. sodium) to replace the reactive hydrogen atom with sodium and the sodium derivative reacted chloropolymer. For example, sodium alkoxides and aryloxides react readily with chloropolymer to yield alkoxide and/or aryloxide substituted polyphosphazenes.

The most common substituents on phosphorus (referred to as "phosphorus-substituents") are the substituted and unsubstituted alkoxides and aryloxides. The alkoxides can contain from 1–12 or more carbon atoms (e.g. methoxy, butoxy, decyloxy and dodecyloxy) and may be substituted with one or more of a broad range of substituents (e.g. halo, alkoxy, polyalkoxy, dialkylamino, nitro, nitrile, etc.).

The aryloxides include phenoxide, naphthoxide and the like which may be substituted with groups such as alkyl, alkoxy, polyalkoxy, halo, nitrile, haloalkyl, alkenyl, alkanoyl, alkanoyloxy, alkenoyl, alkenoyloxy and combinations thereof.

Representative substituent groups are methoxy, butoxy, 2-chloroethoxy, 2,2,2-trifluoroethoxy, 2-methoxyethoxy, 2-ethoxyethoxy, 2-(2-ethoxyethoxy)ethoxy, 3-dimethylaminopropoxy, 2-cyanoethoxy, 2-nitroethoxy, phenoxy, 2-methylphenoxy, 4-ethylphenoxy, 4-octylphenoxy, 4-methoxyphenoxy, 4-butoxyphenoxy, 4-(2-ethoxyethoxy)phenoxy, 4-[2-(2-ethoxyethoxy)ethoxy]phenoxy, 4-chlorophenoxy, 4-fluorophenoxy, 2-bromophenoxy, 4-(trifluoromethyl)phenoxy, 4-allylphenoxy, 2-allylphenoxy, 2-methyl-4-propenylphenoxy, 2-methoxy-4-allylphenoxy, 4-acetylphenoxy, 4-propionylphenoxy, 4-acetyloxyphenoxy, 4-butyryloxyphenoxy, 4-propenoylphenoxy, 4-(but-2-enoyl)phenoxy, 4-propenoyloxyphenoxy, 4-(but-2-enoyloxy)phenoxy and the like including any combination of substituents.

Of these the more preferred are phenoxy and alkylphenoxy groups. The alkylphenoxy can be a 2-, 3- or 4-alkylphenoxy or a polyalkylphenoxy. Alkyls include methyl, ethyl, propyl, butyl, decyl, dodecyl and the like. A particularly preferred polyaryloxyphosphazene contains about 30–60 mole percent phenoxy groups, 30–60 mole percent para-ethylphenoxy groups and 1–20 mole percent 2-allylphenoxy groups.

In a highly preferred embodiment the substituent groups comprise a major amount of fluoroalkoxy groups. Polyfluoroalkoxyphosphazenes are polymers made up of a series of —(P=N)—$_n$ units wherein n is an integer from about 20 to 50,000 or more. The substituents on phosphorus which are not shown are mainly fluoroalkoxy groups having the formula:

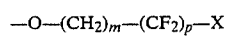

$$-O-(CH_2)_m-(CF_2)_p-X$$

wherein m is an integer from 1 to about 3, p is an integer from 1 to about 20 and X is hydrogen or fluorine. In a more preferred embodiment, m is 1 and p is an integer from 1 to about 10. Most preferably the fluoroalkoxy substituents are mixtures of different fluoroalkoxy groups wherein m and/or p have several values in the various substituents. Most preferably m will be 1 and p will be 1 in a portion of the groups and a mixture of different integers in the range of 2–10 in the remaining fluoroalkoxy groups.

The polyorganophosphazenes must also be substituted with at least some olefinically unsaturated groups. These are groups that have an olefinic double bond in their structure which is capable of further reaction to form a cross-link. Such unsaturated groups include alkenyloxy (e.g. allyloxy, butenyloxy, pentenyloxy, hexenyloxy and the like), alkenylaryloxy (e.g. o-allylphenoxy, m-allylphenoxy, p-allylphenoxy, 4-(but-3-enyl)phenoxy, 2-methoxy-4-allylphenoxy, 2-methoxy-4-propenylphenoxy, 2-methyl-4-allylphenoxy and the like), alkenoyloxy having the formula R-C(O)O- wherein R is an olefinically unsaturated group. Examples of these are acrylates, methacrylates, 4-(propenoyloxy)phenoxy and the like.

The amount of unsaturated substituents can vary from 0.1 mole percent up to 20 mole percent or more of the total substituent groups. A preferred range is about 0.3–10 mole percent. In the polyfluoroalkoxyphosphazenes, the fluoroalkoxy substituents are the major substituents and represent at least 50 mole percent of the total substituent groups on phosphorus and more preferably at least 75 mole percent of the substituent groups. As stated before, the unsaturated substituent groups that represent at least 0.1 mole percent of the total substituent groups up to about 20 mole percent. The remaining substituents, if any, can include the other substituent groups mentioned above such as alkoxy (e.g. methoxy, ethoxy, butoxy, hexoxy, decyloxy, dodecyloxy, eicosyloxy and the like), both substituted and unsubstituted aryloxy groups such as phenoxy, alkylphenoxy (e.g. p-methylphenoxy, o-methylphenoxy, p-ethylphenoxy, p-butylphenoxy and the like), alkoxyphenoxy (e.g. p-methoxyphenoxy, p-ethoxyphenoxy, o-ethoxyphenoxy, p-butoxyphenoxy and the like), halophenoxy (e.g. p-chlorophenoxy, p-bromophenoxy, p-fluorophenoxy, o-chlorophenoxy and the like) and halogens (e.g. chlorine, bromine and the like).

The most preferred polyfluoroalkoxyphosphazenes are those described by Kyker et al., U.S. Pat. No. 3,970,533.

The platinum curing agent can be platinum or any simple platinum compound. Karstedt, U.S. Pat. No. 3,814,730 describes the use of platinum halide complexes of unsaturated siloxanes (e.g. 1,3-divinyltetraphenyldisiloxane) to cure organopolysiloxanes. The platinum halide set forth by Karstedt can be used in the present process but they are not used as complexes and the use of the complex platinum curing agents of Karstedt forms no part of the present invention.

Korshak et al., Polymer Sci., U.S.S.R., Vol. 23, pgs. 477–483 describe the use of the combination of hydride-terminated siloxanes and platinum catalysts to cure polyfluoroalkoxyphosphazenes having some unsaturated groups such as o-allylphenoxy. The present process does not use hydride-terminated polysiloxanes to cross-link the polyfluoroalkoxyphosphazene and thus omits an element taught in the prior art to be essential.

The curing catalyst used in the present process are not complexed with unsaturated siloxanes and are not used in combination with hydride-terminated siloxanes. Although finely divided platinum metal can be used, the preferred platinum catalysts are the platinum halides (e.g. $PtCl_4$, $PtBr_4$ and the like), haloplatinic acids (e.g. $H_2PtCl_6$, $H_2PtBr_6$ and the like) and the hydrates of the foregoing (e.g. $PtCl_4 \cdot nH_2O$, $H_2PtCl_6 \cdot nH_2O$ and the like). Also included are the salts of the haloplatinic acids (e.g. $Na_2PtCl_4$, $NaHPtCl_4$, $Na_2PtCl_6$, $K_2PtCl_6$, $KHPtCl_4$, etc.) and the like including their hydrates.

The amount of platinum catalyst is only a small catalytic amount. This is preferably expressed in terms of parts of platinum by weight per million parts of polyfluoroalkoxyphosphazene. A useful range in which to operate is from about 1 to 100 parts by weight platinum per million parts by weight polymer. A more preferred platinum utilization is about 500–50,000 ppm. Platinum should be kept at the minimum effective amount because it remains in the cured polymer and has a substantial effect on cost.

The platinum catalyst is readily added to the uncured polyfluoroalkoxyphosphazenes in the form of an alcohol solution. Alcohols include methanol, ethanol, propanol, isopropanol, butanol, isobutanol, 2-ethylheptanol and the like. Good results have been achieved using a 5 weight percent chloroplatinic acid solution in ethanol.

The platinum catalyst can be added by several methods. In one method the uncured polymer is dissolved in alcohol or a similar volatile solvent and a small amount of an alcohol solution of the platinum catalyst added. The mixture is thoroughly stirred and then the alcohol and/or other solvent is evaporated under vacuum. Other components such as fillers, plasticizers, stabilizers, pigments and the like can be added to the solution prior to evaporation resulting in a formulated polyorganophosphazene gum which contains the platinum catalyst.

In another method the polyorganophosphazene, platinum catalyst, filler, plasticizer and other blending agents, if used, are combined and mixed in a high intensity Banbury mixer to achieve the formulated gum.

After the polyorganophosphazene gum is formulated as desired to contain the platinum catalyst, it is formed into the desired shape and heated to a moderate temperature (e.g. 75°–150° C.) for a period sufficient to achieve the desired degree of cure. This usually requires about 1–4 hours. The polymer is believed to cure through the olefinically unsaturated groups, —C=C—, and thus the resulting polymer is cross-linked through an aliphatic hydrocarbon group containing two or more carbon atoms, e.g. 2–10 carbon atoms.

The residual platinum catalyst remains in the cured polyorganophosphazene. Thus a further embodiment of the invention is a cured polyorganophosphazene composition comprising cross-linked polyorganophosphazene containing a small residual amount of a platinum-containing catalyst. Since the cured polyorganophosphazene is made from a high molecular weight substantially linear polyorganophosphazene having substituents which contain olefinic unsaturation (e.g. o-allylphenoxy) it can also be described as a cured polyorganophosphazene composition comprising substantially linear high molecular weight polyorganophosphazene which are cross-linked through at least one divalent aliphatic hydrocarbon group to another of said high molecular weight polyorganophosphazenes. The divalent aliphatic group need not be between phosphorus atoms but are generally between organo groups attached to backbone phosphorus atoms such as aryloxy groups. The cured polyorganophosphazene can be used for any of the uses known for cured polyorganophosphazene compositions. They can be used to make parts such as o-rings, seals, coatings, foam insulation and the like. They can be used to make membranes such as semi-permeable membranes used to separate gases or liquids. They can be used to make body implants such as finger joints, false teeth liners and supple sacs that are impermeable to polysiloxane fluid and can be used to make breast implants or other body implants.

The method of curing the polyorganophosphazenes can be readily understood by referring to the following example.

EXAMPLE 1

A solution of 2 grams of polyfluoroalkoxyphosphazene (64.6 mole percent trifluoroethoxy groups, 35 mole percent mixed $C_{3-11}$ fluoroalkoxy groups and 0.4 mole percent o-allylphenoxy groups; (Ethyl Corporation Eypel TM F Polyphosphazene Gum) in 10 mls of ethanol was prepared. To this was added a few drops of a 5 weight percent solution of chloroplatinic acid hydrate ($H_2PtCl_6.6H_2O$) in ethanol to give about 5,000 ppm platinum. The resulting solution was evaporated leaving a light reddish-brown film. This film together with a second film prepared in the same manner but without the $H_2PtCl_6.6H_2O$ was placed in an oven at 120° C. for two hours. The platinum catalyzed film cured as shown by its lack of solubility in methanol, ethanol, methyl isobutyl ketone, acetone or tetrahydrofuran. The uncatalyzed film was still soluble in all of the above solvents showing lack of cure. A retained sample of the film containing the platinum catalyst that was not heated in the oven was found after a week to be only partially soluble in the above solvents indicating partial cure even at room temperature.

EXAMPLE 2

A solution of 2 grams of polyaryloxyphosphazene (52 mole percent phenoxy, 41.5 mole percent 4-ethylphenoxy, 6.5 mole percent 2-allylphenoxy) in 10 ml toluene was prepared. To this was added a few drops of a 30 weight percent solution of chloroplatinic acid hydrate in ethanol to give about 5000 ppm platinum. The solution was then evaporated to give a film. The film was cured at 120° C. for 2 hours. The cured film was not soluble in toluene whereas a film made from the same polymer and heated at 120° C. for 2 hours but without platinum was soluble in toluene.

A specimen of the polyaryloxyphosphazene film which contained the platinum catalyst but was not exposed to the curing heat was found after a week to be insoluble in THF indicating room temperature cure over an extended time period.

I claim:

1. A process for curing a high molecular weight substantially linear polyorganophosphazene having substituent groups bonded to phosphorus, at least a portion of said substituent groups being olefinically unsaturated groups, said process comprising contacting said polyorganophosphazene with a small effective amount of a platinum halide, haloplatinic acid or hydrates thereof or mixtures thereof.

2. A process of claim 1 conducted in the presence of an alcohol promoter.

3. A process of claim 1 wherein said olefinically unsaturated groups are selected from olefinically unsaturated aliphatic groups or olefinically unsaturated aromatic groups.

4. A process of claim 3 wherein said olefinically unsaturated aliphatic groups are alkenyloxy and said olefinically unsaturated aromatic groups are alkenylaryloxy.

5. A process of claim 4 wherein said alkenyloxy is allyloxy and said alkenylaryloxy is an allylphenoxy group.

6. A process of claim 1 wherein said polyorganophosphazene consists essentially of a backbone of repeating —(P=N)— units in which the phosphorus substituents are selected from substituted or unsubstituted alkoxy, substituted or unsubstituted aryloxy and a portion of said phosphorus substituents contain olefinic unsaturation.

7. A process of claim 6 wherein said phosphorus substituents comprise a major amount of fluoroalkoxy groups.

8. A process of claim 7 wherein said fluoroalkoxy groups have the structure:

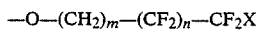

$$-O-(CH_2)_m-(CF_2)_n-CF_2X$$

wherein m is an integer from 1 to 3, n is an integer from 1 to 12 and X is H or F.

9. A process of claim 8 wherein said phosphorus substituents containing olefinic unsaturation are ortho-allylphenoxy groups.

10. A process of claim 9 wherein m is 1, X is H and said allylphenoxy group represents about 1 to 10 mole percent of the groups bonded to phosphorus.

11. A process of claim 6 wherein said phosphorus substituents comprise a major amount of aryloxy groups.

12. A process of claim 11 wherein said aryloxy groups are selected from phenoxy or substituted phenoxy wherein said substituents are selected from alkyl, alkoxy, polyalkoxy, halo, haloalkyl, alkenoyl, alkenoyloxy, alkenoylyl, alkenoyloxy or combinations thereof.

13. A process of claim 12 wherein said phosphorus substituents containing olefinic unsaturation are allylphenoxy groups.

14. A process of claim 13 wherein said phosphorus substituents comprise phenoxy groups, alkylphenoxy groups and ortho-allylphenoxy groups.

15. A process of claim 14 wherein said phosphorus substituents comprise about 30–60 mole percent phenoxy groups, about 30–60 mole percent para-ethylphenoxy groups and about 1–20 mole percent 2-allylphenoxy groups.

* * * * *

UNITED STATES PATENT AND TRADEMARK OFFICE
CERTIFICATE OF CORRECTION

PATENT NO. : 4,734,471

DATED : MARCH 29, 1988

INVENTOR(S) : SUAE-CHEN CHANG

It is certified that error appears in the above-identified patent and that said Letters Patent is hereby corrected as shown below:   Title page:

References Cited reads "U. S. 3,814,073" and should read
-- U. S. 3,814,730 -- .

Column 6, line 18 reads " -(P=N)- and should read --
-(P̄=N)- -- . (Compare Page 10, Claim 6, line 2)

Signed and Sealed this

Twenty-third Day of August, 1988

Attest:

DONALD J. QUIGG

*Attesting Officer*

*Commissioner of Patents and Trademarks*